United States Patent [19]

Mundil

[11] 4,027,848
[45] June 7, 1977

[54] THERMALLY CONTROLLED FLUID FLOW REGULATING OR SHUT-OFF VALVES

[75] Inventor: Waldemar Dietmar Mundil, Pulheim, Germany

[73] Assignee: Deutsche Vergaser GmbH & Co Kommanditgesellschaft, Neuss, Germany

[22] Filed: Oct. 14, 1975

[21] Appl. No.: 622,379

[30] Foreign Application Priority Data

Nov. 13, 1974  Germany .......................... 2453757

[52] U.S. Cl. .............................. 251/11; 236/68 R; 236/101 E
[51] Int. Cl.² ................... F16K 31/04; F16K 31/56
[58] Field of Search ........ 251/11; 236/68 R, 101 E, 236/48 R

[56] References Cited
UNITED STATES PATENTS

| 2,989,281 | 6/1961 | Fritts ..................................... 251/11 |
| 3,856,259 | 12/1974 | Doherty, Jr. .......................... 251/11 |

Primary Examiner—Arnold Rosenthal
Attorney, Agent, or Firm—Toren, McGeady and Stanger

[57] ABSTRACT

A fluid flow regulating or shut-off valve of the kind having a bimetallic element which regulates or opens and closes a flow passage through the valve in dependence upon temperature is provided with at least one electrically heatable PTC-element which is in thermal contact with the bimetallic element. Heating of the PTC-element by control of the supply of electricity to it thus controls the operation of the valve. The bimetallic element is preferably in the form of a snap-acting bending bimetallic plate which is heated by radiation from the PTC-element and which itself forms the valve closure member. With the bimetallic plate snapped in one direction, a passage through the valve is opened, but when the plate snaps in the other direction, it bears against a sealing ring surrounding a valve opening within the valve to close and seal the opening and thus shut the valve.

8 Claims, 1 Drawing Figure

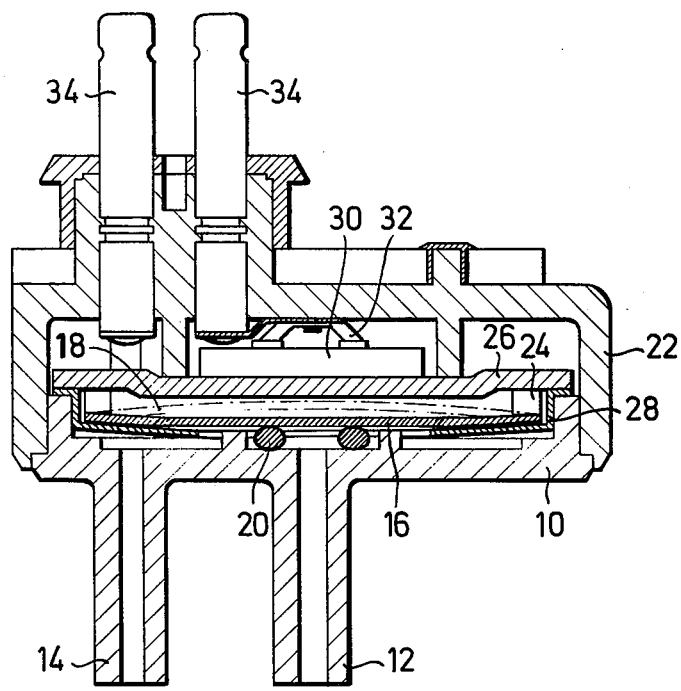

THERMALLY CONTROLLED FLUID FLOW REGULATING OR SHUT-OFF VALVES

This invention relates to fluid flow regulating or shut-off valves having a bimetallic element which regulates or opens and closes a flow passage through the valve in dependence on temperature.

Such valves are known and may be used for example in exhaust gas recycling systems for internal combustion engines. When used in this way, the valve may be mounted on the cylinder head of the engine so that the actuation of the valve takes place in dependence on the cylinder head temperature or on the heat transmitted from the cylinder head to the bimetallic element. The flow rate of air or gas in the system is thermally regulated in this manner by opening and closing of the valve brought about from the cylinder head through water or some other heat conducting liquid.

Existing valves having bimetallic control must, if they are not to be regulated by the fluid flowing through the valve, be thermally conductively connected with a suitable thermal contact body in order that the bimetallic element can be heated by thermal conduction and can actuate the valve. For many fields of use, for example in the closing of an air duct as a function of time and temperature, such a direct contact-making and thermal conduction from an external member to the interior of the valve are simply not possible or can only be achieved with difficulty. For this reason, the use of the known bimetallic-controlled valves is limited to specific purposes in which there are no space or mounting problems or difficulties of heat transfer. Moreover, the known valves exhibit considerable heat-conduction-dependent delay in their response behaviour, which in many cases is undesirable.

The object of the present invention lies in the creation of a valve of the kind described above, which while avoiding the disadvantages set out is comparatively simple to construct and which can be actuated, when desired, in a manner largely free from delay, even over fairly long distances using no thermal conduction. The aim is also to provide a valve which is moreover capable of use for many purposes and is simple to adjust to particular operating requirements, for example a specific time behaviour.

To this end, according to this invention, in such a valve, the bimetallic element is in thermal contact with at least one electrically heatable PTC-element, that is a semi-conductor element posessing a positive temperature coefficient.

As a result it is possible, independently of the actual location of the valve, to carry out its heat-dependent actuation electrically and thus also at a great distance, since the heat for actuation is produced directly in the valve and is not introduced into its interior by thermal conduction from outside via a valve housing. In any temperature-dependent air or other duct controls it is only necessary for the above valve to be installed in the duct and to be connected up electrically. The electrical heating of the PTC-element can then be made dependent upon any desired parameters and, for example, upon a temperature existing at a completely different location, without the need for any thermal bridges or connections to exist. Since the heat generation takes place directly in the valve, the valve can be actuated at a correspondingly high loading of the PTC-element, in a manner which is virtually delay-free, which is not possible with existing thermovalves having no internal heat source. Moreover, a much more sensitive actuation, satisfying predetermined requirements for example time-dependence in a specific manner, can be effected through the electrical control of the PTC-element.

The valve in accordance with the invention is therefore, while being simple to operate, extremely wide ranging in its capability and capacity for adaption to different requirements.

There is preferably as thermal radiation contact between a bending bimetallic plate and the PTC-element and this may be produced through the intermediary of a radiating plate in thermally conducting connection with the PTC-element. The thermal radiation contact has the advantage that the thermal behaviour of the bimetallic plate is largely constant even allowing for the necessary actuating movement of the bimetallic plate, and moreover with such a valve it is possible to maintain the absence of an continuously existing thermal conduction bridge, for example at the peripheral regions. In addition, the valve tolerances can be larger owing to the use of the thermal radiation contact, thus enabling the manufacture and assembly of the valve to be made more simple and economic.

In one especially simple example of the valve, the bimetallic plate is peripherally clamped and its centre portion extends over a valve opening which is surrounded by a sealing ring and, when the valve is closed, the plate bears tightly on the sealing ring. With such direct control, the actuation of the valve can moreover be made dependent in part upon the temperature of the fluid flowing through the valve, for example air or other gas, in order to arrive thus at an operation of the valve which is dependent both on the heating of the PTC-element and on the fluid temperature. It may be advantageous for the bimetallic plate to have the fluid continuously flowing over it also when the valve is closed, for example by means of an auxiliary duct. It is also of course possible to obtain from the temperature of the flowing fluid a further electrical signal, which can be utilised exclusively or in conjunction with another signal for controlling the PTC-element.

One especially practical example of the valve is constructed in such a manner that the radiating plate is clamped between a valve base and a valve cover and the bimetallic plate is clamped between a spacer bearing against the radiating plate and valve base. In this case, the support from the valve base can be effected through a tophat-shaped holder. Such a construction is simple and permits rapid assembly and dismantling for replacement purposes. When assembling the valve components, the radiating disc, the bimetallic plate and also if required the PTC-element may be automatically clamped and brought into the required heat radiating and heat conducting positions. If the spacer and the tophat-shaped holder are made of a heat insulating material, the thermal influencing of the bimetallic disc is limited exclusively to the heat radiation from the radiating disc, so that no disturbing thermal influences can arise.

Preferably, the PTC-element bears against the back face of the radiating disc and is electrically connected to plug contacts leading outwards through a housing of the valve. The valve can thus be very rapidly and simply electrically connected and it also makes possible a rapid heating up of the radiating disc by thermal conduction along a short path which is substantially equal only to the thickness of the radiating disc. If the PTC-element is pressed resiliently against the radiating disc, this provides a considerable guarantee of good thermal contact, which is necessary to enable the radiant heat to be available as rapidly as possible. Moreover, the time behaviour can be modified by different intensities of heating of the PTC-elements, which are in thermal contact with the radiating disc and can be heated to different operating temperatures.

An example of a valve in accordance with the invention is illustrated in the accompanying drawing which is a diametric section through the valve.

The valve comprises a circular valve base 10 having two air connections 12 and 14 and a valve cover 22 mounted and screwed on the base. The connection 12 which is central is surrounded in the interior of the valve by a sealing ring 20, which, in the closed position of a bimetallic plate 16 as shown in the drawing, bears against the ring in a sealing manner. The bimetallic plate 16 thus itself constitutes the valve closure member. When a specific thermal actuation threshold is reached, the bimetallic plate 16 snaps across into an open position indicated in chain dotted lines at 18, so that a flow path between the valve connections 12 and 14 is opened.

The peripheral portion of the bimetallic plate 16 bears, firstly through a thermally insulating top hat-shaped holder 28 against the valve base 10, and secondly via a thermally insultating spacer 24 against a radiating disc 26, which is clamped together with the top hat-shaped holder 28 between the valve cover 22 and the valve base 10. The disc 26 and the plate 16 define therebetween an enclosed space or volume into which the fluid flowing between the connections 12 and 14 cannot enter. This closed volume is sealed by the cooperation between the parts 26 and 28 whereby the outer periphery of the plate 26 is pressed against the holder 28 by the cover 22 acting through the disc 26 and the spacers 24. Thus, it will be seen that the clamping action between the cover 22 and the base 10 provides a sealing effect closing the volume or space between the plate 16 and the disc 26. The disc 26 is thermally conducting and has one radiating surface towards the bimetallic plate 16. An electrically heatable PTC-element, that is a semi-conductor posessing a positive temperature coefficient, is pressed against the upper face of the radiating disc 26 in such a manner, and for example elastically, that a good thermal transfer exists between this element and the radiating disc. This thermal transfer is, of course, enhanced by maintaining the space between the disc 26 and the plate 16 closed, as previously indicated. The PTC-element 30 is electrically connected through conductors 32, or alternatively, in part through the radiating disc 26, to outwardly leading plug contacts 34, which serve for supplying the necessary electric heating power.

The valve illustrated and described is very simply and economically constructed, which makes possible rapid assembly and dismantling and also replaceability of the various operating components used. When assembling the valve parts, these operating components are automatically clamped and fixed as the cover is screwed onto the face so that afterwards no further adjustments and settings are necessary with regard to the thermal bridges and heat radiation paths.

It is also of course possible for other heating elements to be used for the direct generation of heat and actuating effect inside the valve as a function of external operations, but PTC-elements have proved particularly suitable due to their special heating-up characteristic. The bimetallic element should in general not be heated to a temperature higher than about 120° C, and the self-regulation of the semi-conductor element which forms the heating member ensures that this requirement is complied with by the stabilising point imparted to it. It is also possible, by means of different PTC-elements which differ in their stabilising temperatures, to vary the time which elapses before snapping over of the bimetallic plate takes place for a constant steady-state temperature. In every case, the valve which can be used for example for any pneumatic control operations, is especially suitable for many and varied applications, and may easily be adapted, due to the combination of the bimetallic plate with an in-built heating device.

I claim:

1. A fluid flow control valve comprising a thermally responsive bimetallic element, means defining a fluid flow passage through said valve, means defining a valve seat located to be engaged and disengaged by said bimetallic element to closed and open said fluid flow passage, a thermally conductive member, means mounting said thermally conductive member together with said bimetallic element to define therebetween an enclosed volume insolated from said fluid flow passage, and temperature varying means mounted on said thermally conductive member in thermally conductive relationship with said bimetallic element operating to control said bimetallic element to open and close said valve.

2. A valve according to claim 1 wherein said temperature varying means is a PTC-element.

3. A valve according to claim 1, wherein said temperature varying means is mounted against a side of said thermally conductive member opposite the side thereof on which said bimetallic element is located.

4. A valve according to claim 1, further comprising a valve cover attached to said base, said thermally conductive member being held in clamped engagement between said valve base and said valve cover, and spacer means spacing said bimetallic element from said thermally conductive member to form said enclosed volume therebetween, said valve base and valve cover being arranged to effect a clamping action tending to produce a sealing effect between said bimetallic element and said thermally conductive member.

5. A valve according to claim 4, further comprising top hat-shaped holder means interposed between said valve base and said bimetallic element, said bimetallic element having a periphery clamped thereabout between said spacer means and said top hat-shaped holder means.

6. A valve according to claim 2, further comprising means holding said PTC element against said thermally conductive member on the side thereof remote from the side upon which said bimetallic element is located, a housing enclosing said valve, electrical plug contacts extending through said housing and means electrically connecting said PTC element to said plug contacts.

7. A valve according to claim 6, wherein said means holding said PTC element against said thermally conductive member includes elastic means elastically pressing said element against said member.

8. A valve according to claim 3, wherein said bimetallic element comprises a peripheral portion and a central portion and wherein said valve seat is formed by a sealing ring surrounding said means defining a fluid flow passage, said valve further comprising means clamping said peripheral portion of said bimetallic element in a position wherein said central portion thereof extends over said sealing ring, said bimetallic element being movable between a position in contact with said sealing ring to close said fluid flow passage and a position away from said sealing ring to open said fluid flow passage in response to said temperature varying means.

* * * * *